United States Patent
Ratzlaff et al.

[11] Patent Number: 5,875,582
[45] Date of Patent: *Mar. 2, 1999

[54] ARTIFICIAL FISHING LURE

[75] Inventors: George Ratzlaff, Destin, Fla.; Rodney L. Bridges, Lilburn, Ga.; William R. Spencer, Jr., Santa Rosa Beach, Fla.; Wayne G. Anderson, Tacula, Ga.

[73] Assignee: Megabyte Leisure International Inc., Destin, Fla.

[*] Notice: This patent issued on a continued prosecution application filed under 37 CFR 1.53(d), and is subject to the twenty year patent term provisions of 35 U.S.C. 154(a)(2).

[21] Appl. No.: 694,408

[22] Filed: Aug. 12, 1996

[51] Int. Cl.$^6$ ................................................ A01K 91/04
[52] U.S. Cl. .......................................... 43/26.1; 43/42.06
[58] Field of Search ................................ 43/26.1, 26.2, 43/42, 42.03, 42.02, 42.06, 42.09, 42.12, 42.24

[56] References Cited

U.S. PATENT DOCUMENTS

| | | |
|---|---|---|
| 2,691,235 | 10/1954 | Pcola . |
| 2,724,205 | 11/1955 | Howard ..................... 43/26.2 |
| 2,987,844 | 6/1961 | Hill ........................... 43/26.2 |
| 3,105,317 | 10/1963 | Foz ........................... 43/26.2 |
| 3,628,274 | 12/1971 | Wojahn . |
| 3,715,830 | 2/1973 | Price . |
| 3,728,811 | 4/1973 | Weimer . |
| 3,973,349 | 8/1976 | England ..................... 43/42.09 |
| 3,974,590 | 8/1976 | Boone . |
| 4,028,839 | 6/1977 | Stubblefield . |
| 4,098,017 | 7/1978 | Hall .......................... 43/42.6 |
| 4,536,985 | 8/1985 | Caviness . |
| 4,602,451 | 7/1986 | Perez et al. . |
| 4,676,020 | 6/1987 | Taylor et al. . |
| 4,697,378 | 10/1987 | Tunstall . |
| 4,713,967 | 12/1987 | Overs . |
| 4,757,631 | 7/1988 | Anson-Smith . |
| 4,771,567 | 9/1988 | Cannon . |
| 4,787,167 | 11/1988 | Wroclawski . |
| 4,832,650 | 5/1989 | Tong . |
| 4,877,330 | 10/1989 | Torre . |
| 5,105,573 | 4/1992 | Mays . |
| 5,115,593 | 5/1992 | Keough . |
| 5,159,773 | 11/1992 | Gentry et al. . |
| 5,177,891 | 1/1993 | Holt . |
| 5,193,299 | 3/1993 | Correll ..................... 43/42.24 |
| 5,203,103 | 4/1993 | Hawley . |
| 5,237,771 | 8/1993 | Watson et al. . |
| 5,428,916 | 7/1995 | Dubriske . |
| 5,456,039 | 10/1995 | Pisoni ....................... 43/42.24 |
| 5,483,767 | 1/1996 | Langer ........................ 43/4 |
| 5,511,335 | 4/1996 | Langer ........................ 43/4 |
| 5,581,930 | 12/1996 | Langer ....................... 43/17 |

*Primary Examiner*—John Sipos
*Assistant Examiner*—Christopher W. Day
*Attorney, Agent, or Firm*—Harness, Dickey & Pierce, P.L.C.

[57] ABSTRACT

A self-propelled fishing lure which includes a head to which a watertight housing is secured. A propulsion mechanism is located within the housing and is driven by a battery source. Secured over the housing is a resilient body, a portion of which defines a passageway that permits the introduction of water to and the expulsion of water from the propulsion mechanism. At least a portion of the body is provided in a first orientation relative to the head and that portion is movable from the first orientation into a second orientation upon actuation of the propulsion mechanism and the expulsion of water out through the passageway. As a result of the expulsion of water and the movement of the body portion into the second orientation, the lure is propelled through the water under its own power.

14 Claims, 2 Drawing Sheets

ARTIFICIAL FISHING LURE

BACKGROUND OF THE INVENTION

1. Field of the Invention

This invention generally relates to fishing lures. More specifically, the invention relates to an artificial lure and still more specifically to one which is self-propelled through water in a fish attracting manner.

2. Description of the Prior Art

Many fishermen, both men and women, prefer the challenge of catching fish on artificial lures to that of using live or other types of bait. The reason for this preference varies from fisherman to fisherman, but perhaps the two most common reasons given are that, to some, it is more of a challenge to catch fish by artificial means and it simplifies the effort and time required for "getting on the water". No longer is it necessary for the fisherman capture, purchase, prepare or otherwise obtain bait, transport the bait (usually in its own separate container), and handle the bait (which can be messy).

Since they are widely used under a variety of fishing conditions, artificial fishing lures (hereinafter just "lures") have evolved into a number of different styles. These include plugs, jigs, spinners, spoons, flies and others. One common trait between these lures is that they all depend upon the fisherman's skill to catch fish. This skill manifests itself in how the fisherman manipulates the presentation and retrieval of the lure to attract and catch fish. The action of the lure in the water during retrieval is imparted by a combination of factors, including, not only the forces of the water on the lure, but also the lure's shape, buoyancy, weight and the fisherman's ability to control the presentation of the lure, both initially and during retrieval. In this regard, the fisherman's skill and experience is of the upmost importance.

While artificial lures all depend in a large part on the skill of the fishermen for their effectiveness, there is an additional lure subset which is less dependent on that skill level. These lures aid the fishermen by at least partially providing for their own movement and action. The movement can be of two types. The first is self-propulsion of the lure through the water. The other merely causes the lure to move in place while not particularly being propelled. An example of the latter type includes worm-type lures where a mechanism causes the worm body to "wriggle". The former type has been seen to include numerous types of varieties on the motor driven propeller.

Natural bait, which includes healthy, injured and dying prey, is quite animated in its movements and this movement is, more often than not, in the form of a periodic quick body movement. Previous self-propelled lures, however, have failed to mimic this natural movement of gamefish prey. For example, in the propeller type of self-propelled lures, the propeller causes the lure body to be pulled or pushed through the water without animation. To the contrary, natural prey moves as a result of the movement of the prey's body. It is this propelling movement of the prey's body which has not been mimicked.

In view of the foregoing limitations of the prior art devices, as well as other disadvantages not specifically mentioned above, it should be apparent that there still exists a need for an improved self-propelled artificial fishing lure.

It is therefore a primary object of this invention to fulfill that need by providing a self-propelled artificial fishing lure which more closely mimics the natural movement of prey through water.

It is also an object of this invention to provide a self-propelled artificial fishing lure in which the body of the lure is manipulated to assist in propelling the lure through water.

Yet another object of the present invention is to provide a self-propelled artificial fishing lure having a resilient body which moves as a result of water being expelled out through an opening in the body.

A further object of this invention is to provide a self-propelled artificial fishing lure which does not rely upon external propellers to move it through the water.

Another object of this invention is to provide a self-propelled artificial fishing lure whose rate of movement is dependent upon water temperature.

SUMMARY OF THE INVENTION

As briefly described above, these and other objects are accomplished according to the present invention by providing a self-propelled fishing lure where a resilient body portion of the lure is manipulated in a manner mimicking the natural movement of the prey which the lure is intended to represent. The lure does not include any exterior propulsion mechanism, such as a propeller. Lacking an external propeller, the movement of the resilient body in the present invention is not merely the result of the lure moving through the water and the water acting on the body. Rather, movement of the resilient body is caused by forcibly expelling water out through a passageway and opening in the body. The resilient nature of the body and the force of the expelled water allows the body to change its orientation relative to the rest of the lure, thereby mimicking the movement of a tail or other portion of the prey.

More specifically, the fishing lure of the present invention includes a head to which the resilient body is attached. Mounted to the head and encased within the body is a propulsion mechanism. This mechanism includes an impeller which is used to draw water in through one opening and expel water out through another in the body of the lure to propel the lure. The impeller is driven by a small electric motor that is in turn powered by a battery source. An electric circuit is also provided to operate the motor and impeller on a periodic basis. In this manner, the lure imitates the generally periodic movements of natural prey.

The resilient body itself includes a central cavity within which the propulsion mechanism is received. Also defined in the body is a passageway that includes both inlet and outlet passageway portions, respectively leading to and from the impeller. These passageway portions communicate with inlet and outlet openings in the exterior surface of the body. The inlet opening is located generally forward on the body relative to the outlet opening, which is located near the end of the body's tail.

The resilient nature of the body ensures that at least a portion of the body, the tail portion, will move relative to the head (from a first orientation to a second orientation) when water is being expelled through the outlet opening. It is the combined movement of the body and the force of the expelled water which propel the lure through the water and give the lure its life-like appearance.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
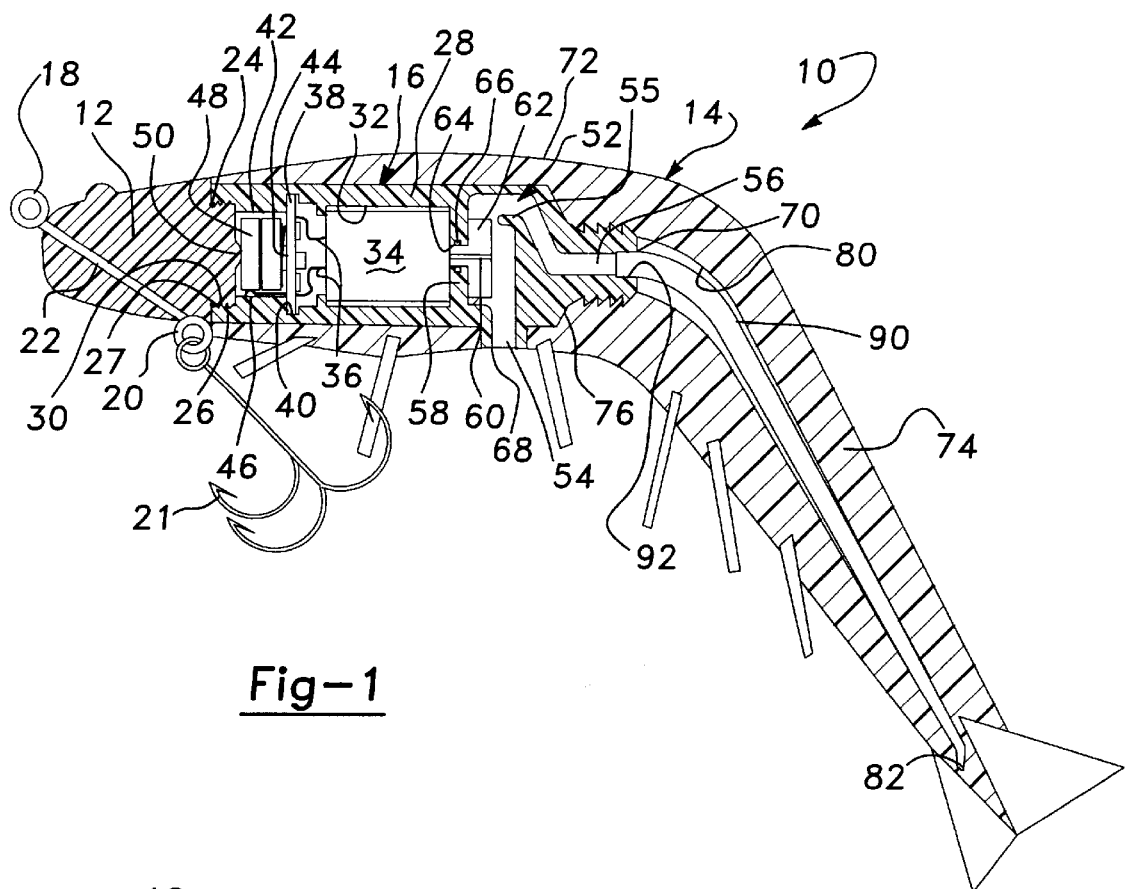
FIG. 1 is a cross-sectional view of a fishing lure embodying the principles of the present invention.
Figure 2:
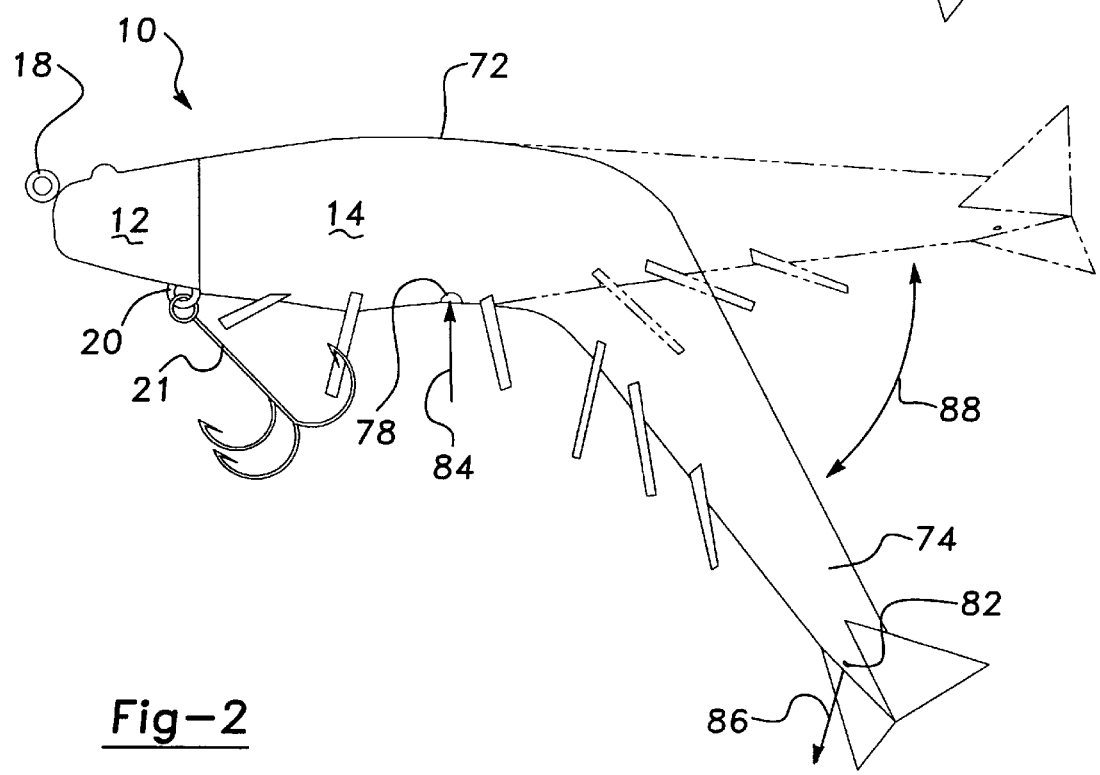
FIG. 2 is a perspective view of a fishing lure embodying the principles of the present invention and further illustrating in phantom the relative positions of the resilient body of the lure.

Referring now in detail to the drawings, there is shown in FIG. 2 a perspective view of an artificial fishing lure, generally designated at 10, embodying the principles of the present invention. The artificial fishing lure 10 (hereinafter just "lure 10") principally includes a head 12, a resilient body 14 and a propulsion mechanism 16. The propulsion mechanism 16 is more specifically shown in FIG. 1.

As seen in the FIG. 1, the lure 10 of the present invention is illustrated in a version intended to mimic the appearance of a shrimp. While illustrated and discussed in connection with this depiction, it should be understood that a lure 10 embodying the principles of the present invention could be provided in any one of numerous alternative representations. For example, the head 12 and body 14 could be such that the lure 10 represents one of the many varieties of bait fish. In that instance, instead of the tail of the body 14 moving in an up and down fashion as further described below, the tail of the body 14 could be made to move in a side-to-side motion. It is to be further understood that other varieties of natural prey can be mimicked by the present invention and that the present invention should not be interpreted as being limited to any one variety. With the above in mind, the shrimp version of the present invention will now be described.

As mentioned above, the lure 10 principally includes three portions, the head 12, the body 14 and the propulsion mechanism 16. The head 12 is provided in a generally conical or other shape, to represent the head of the shrimp, and has mounted to it a pair of eyelets 18 and 20. One eyelet, the line eyelet 18, is secured to the head generally toward the forward and upper end of the head 12 while the remaining eyelet, the hook eyelet 20, is secured on the lower side and generally toward the rear of the head 12. As their respective names indicate, the line eyelet 18 is intended to provide a means by which a fishing line is attached to the lure 10. The hook eyelet 20 provides for the mounting of a treble or other hook to the lure 10.

The eyelets 18 and 20 can be secured to the head 12 in a variety of ways. In the illustrated embodiment, the head 12 is molded or otherwise formed out of a rigid foam or hard plastic and the eyelets 18 and 20 are illustrated as being unitarily formed with one another. In this construction, the head 12 is formed over a connecting shaft 22 which extends between the eyelets 18 and 20. As an alternative, the eyelets 18 and 20 can be independent of one another and provided with threaded ends for engagement with the head 12. Obviously, the head 12 itself can be made of alternate materials as well.

As more fully seen in FIG. 1, the rearward end of the head 12 includes a stepped down shoulder portion 24. From the shoulder portion 24 protrudes an externally threaded extension 26 to which the propulsion mechanism 16 is secured.

The propulsion mechanism 16 is encased within a shell or housing 28 formed of hard plastic or another suitable material. A forward end of the housing 28 includes an internally threaded portion 30 which matingly engages the threaded extension 26 of the head 12. To ensure a water tight seal between the shoulder 24 and the threaded portion 30 of the housing 16, an O-ring 27 is positioned between the shoulder 24 and a forward face of the threaded portion 30.

Located within the housing 28 are the working portions of the propulsion mechanism 16. To facilitate the positioning of these working portions in the housing 28, the housing 28 is preferably of a two-piece, clam shell-type design in which the two halves are glued, welded or otherwise joined together after the working elements have been properly positioned therein. Regardless of the manner in which the two halves of the housing 28 are joined together, the joining must be of such a nature so as to form a waterproof seal about the working components.

Located within a central cavity 32 defined in the housing 28 is an electric motor 34. The motor 34 is a direct current motor that is coupled by a pair of lead wires 36 to a printed circuit board 38. The circuit board 38 is mounted transversely in the housing 28 and is generally retained within a recessed or groove portion 40 located forward of the motor 34 in the housing 28. Various electrical components, as further described below, are provided on the circuit board 36 so as to function as a controller and control operation of the motor 34 in the preferred periodic manner.

Extending from the circuit board 38 into a forward cavity 42 of the housing 28 are a pair of battery contacts 44 and 46. The first of these contacts is positioned generally centrally on the circuit board 38 so as to be generally aligned with the axis of the threaded extension 26 from the head 12. The opposing battery contact 46 extends from the circuit board 38, along the side of the cavity 42. Accordingly, the two contacts 44 and 46 are located to contact opposite terminals of a battery or batteries 48.

To ensure proper engagement of the batteries 48 with the contacts 44 and 46, a nub 50 is centrally formed along the axis of the threaded extension 26. When the housing 28 is properly engaged with the head 12, the nub 50 of the threaded extension 26 will force proper engagement of the batteries 48 with the contacts 44 and 46. Two batteries 48 are shown in the illustrated embodiment.

The opposing or rear portion of the housing 28 has a substantially self-contained passageway 52 defined through it. The passageway 52 itself includes an inlet passageway portion 54 and an outlet passageway portion 56 which are separated from the other interior portions of the housing 28 by a wall 58. Extending through the wall 58 is a rotational output shaft 60 of the motor 34. An impeller 62 is mounted to the distal end of the output shaft 60 so as to be located within the passageway 52. In order to form a seal between the aperture in the wall 58 and the output shaft 60, the impeller 62 is provided with an axial portion 64 that extends over the output shaft 60 and through the wall 58 and which is circumferentially engaged by an O-ring 66. The O-ring 66 is received within a groove defined in the aperture of the wall 58.

The impeller 62 is positioned within the passageway 52 between the inlet passageway 54 and the outlet passageway 56 and includes radially oriented blades. Preferably, the inlet passageway 54 is oriented transversely to the rotational axis of the impeller 62 and is located so as to be positioned axially beyond the impeller 62. An end wall 55 formed in the housing is positioned to correspond generally with the outer diameter of the impeller 62 and the end wall 55 thereby defines the transition from the inlet passageway 54 to the outlet passageway 54, with the impeller 62 being located in this transition. In the illustrated embodiment, the inlet passageway 54 is also oriented downwardly and the outlet passageway 56 is oriented axially with respect to the lure 10.

If desired, however, these can be varied. The illustrated orientations, however, are believed to be preferable in the shrimp version to impart the desired action to the lure 10 and impeller 62.

To assist in maintaining the resilient body 14 over the housing 28, the outlet passageway 56 progresses through an externally ringed protrusion 71 that is integrally formed with the remainder of the housing 28. The ringed protrusion 71 operates as a "Christmas tree-type" fastener and engages the resilient body 14 to assist in securing the body 14, along with the body's own resilient nature, to the remainder of the housing 16.

The body 14 is formed from a soft, resilient material which will allow for movement of the tail end of the body 14 under the forces described herein. As such, the nature of the material is that of the plastic typically used for the soft bodies of numerous fishing lures, such as jigs bodies and plastic worms. The specific material for the body 14 is not critical to the present invention in and of itself so long as the material allows the body 14 to operate in the intended fashion.

The body 14 is unitary but generally includes two portions, a stomach or forward portion 72 and a tail portion 74. A cavity 76 extends substantially through the length of the body 14. In the forward end of the cavity 76, the shape of the cavity generally conforms to the exterior shape of the housing 28. In this manner, the stomach portion snugly fits over the housing 28 and abuts the head 12 forming a generally smooth transition between the two. An opening or passageway 78 is provided in the body to coincide with the inlet opening 68 of the passageway 52 and the two cooperate to allow water to be drawn into the propeller 62. Similarly, a portion of the cavity 76 forms an exit passageway 80 which communicates with outlet passageway 56 and outlet opening 70 to direct expelled water to an exit opening 82 in the tail 74 of the body 14. As seen in FIG. 1, adjacent the exit passageway 80, the walls defining the cavity 76 engage the ringed protrusion 72 and help retain the body 14 on the housing 16 as described above.

The natural or unbiased orientation of the body 14 is such that the tail portion 74 is axially offset from the forward portion 72 and the head 12. In the illustrated shrimp version, this is downward relative to the remainder of the lure 10. This downward position of the tail 74 is hereinafter referred to as the first orientation or position. As a result of the operation of the motor 34 and the expulsion of water, the tail portion 74 moves upward out of this first orientation and into a second position or orientation. It is the movement of the tail 74 between these two orientations which mimics the movement of the intended natural prey.

During use, electricity is provided from the batteries 48 to the circuit board 38. The circuit board 38 causes the motor 34 to periodically operate and rotate the impeller 62. Rotation of the impeller 62 results in the inflow of water (as designated by arrow 84) through the inlet opening 68 of the inlet passageway 54 and the expulsion of the water through the outlet and exit passageways 56 and 80 and further through the exit opening 82 (as generally designated by arrow 86). This expulsion of the water through the resilient tail 74 is of a force sufficient to cause the tail 74 to move from its first orientation to its second orientation (designated by arrow 88). This is generally illustrated in phantom in FIG. 2.

In the shrimp variety of the present invention, the first orientation of the tail 74 is generally downward relative to the remainder of the lure 10. The combination of the upward movement of the tail 74 into its second position and the expulsion of water (arrow 86) out of the exit opening 82 propels the lure 10 in a manner generally simulating a natural shrimp. Hopefully, this self-propelling action of the lure 10, in combination with the skill of the fisherman, will entice a gamefish to strike the lure 10.

It is anticipated that the body 14 of the lure 10 will be subjected to significant wear as a result of fish strikes and that the body 14 will need to be periodically replaced. Since a puncture into the exit passageway 80 would lessen the self-propelling capabilities of the lure 10, in an alternative embodiment of the present invention, a length of tubing 90 is fitted within a recess 92 defined in the outlet opening 70 of the outlet passageway 56 and ringed protrusion 71. The tubing 90 extends generally to the exit opening 82 but may be shorter if desired. The purpose of the tubing 90 is to enhance the durability of the tail 74 against punctures and tears, as might normally be encountered during fishing activity. In this regard, the tubing 90 lessens the frequency with which the body 14 will need to be replaced. The tubing 90 can be constructed from a variety of plastics or rubber. The only constraint upon the material selection is that the material must not significantly impede the movement of the tail 74 from its first orientation to its second orientation.

Figure 3:
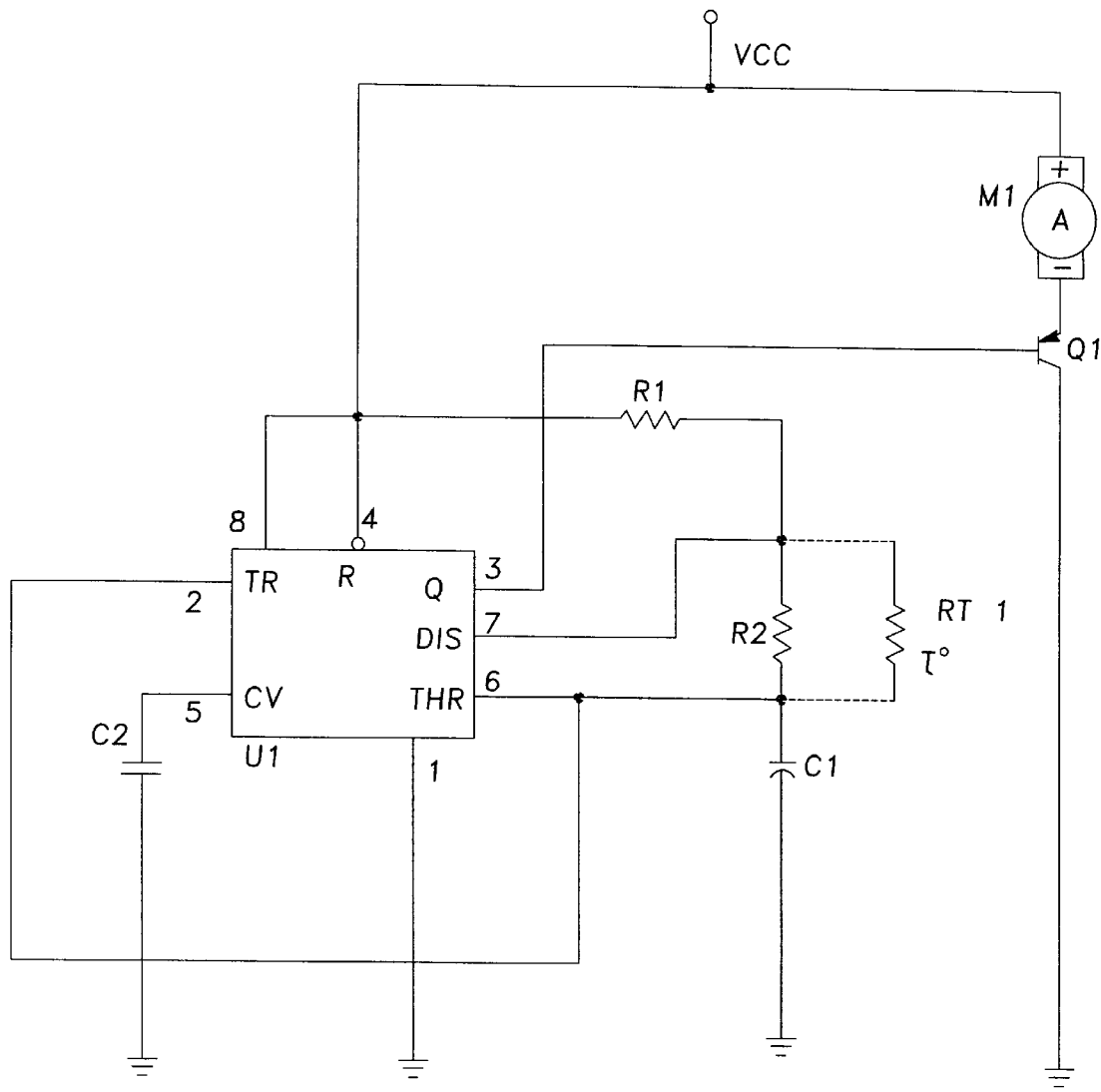
FIG. 3 is a schematic diagram of the circuit board utilized in the present invention.

To operate the motor 34 in the desired periodic fashion, the circuit board 38 is constructed to operate off of two 1.5 v batteries. FIG. 3 diagrammatically illustrates the circuit board 38. The circuit board 38, powered by a 3 volt battery pair VCC, includes an integrated circuit timer U1, which is an LMC555, a CMOS version of the well characterized NE555 timer. Resistors R1 (560K, SM 1206), and R2 (20K, SM 1206) and capacitor C1 (100 $\mu$F, 6.3 volt) set the initial frequency and duration of astable operation of the timer U1. This astable operation is a high (3 v) low ($\phi$v) squarewave oscillation which is present on pin 3 as an output of the timer U1. The output is then used to turn transistor Q1, a PNP transistor (MMBT3906, 5023) "on" and "off" similar to a switch. This switching action in turn controls the "on/off" cycle of an approximately sized DC motor M1. In this fashion, the repetitive rate and duration of "on" time for the motor M1 is controlled.

In another embodiment, the initial frequency and duration set by resistors R1, R2 and capacitor C1 may be further altered by the addition of thermistor RT1, shown in parallel with resistor R1. This component RT1 causes the frequency and duration of "on" time for the timer U1 to vary over temperature. It preferably varies in such a manner that the periodic rate of operation of the DC motor M1 becomes slower in colder water environments, thus simulating the more lethargic nature of prey in these environments, and increase in warmer water environments. As such, the lure 10 more closely mimics the action of natural prey.

While the above description constitutes the preferred embodiment of the present invention, it will be appreciated that the invention is susceptible to modification, variation and change without departing from the proper scope and fair meaning of the accompanying claims.

We claim:

1. A self-propelled fishing lure comprising:
   a body member defining a cavity and a first passageway;
   a resilient tail member secured to said body member, defining a second passageway corresponding with said first passageway, and exhibiting a first unbiased orientation and a second biased orientation relative to said body member;
   propulsion means at least partially located in said cavity for propelling water through said passageways and for forcing said tail member to move from said first unbiased orientation to said second biased orientation;

a controller located in said cavity, wherein said controller periodically operates said propulsion means;

hook means for securing a fishing hook to said lure; and line means for securing a fishing line to said lure;

such that upon selective activation of the controller, the propulsion means propels water through the passageways, forcing the tail member to move from the first unbiased orientation to the second biased orientation and propelling the fishing lure through water.

2. A fishing lure as set forth in claim 1 wherein said controller includes at least one battery.

3. A fishing lure as set forth in claim 1 wherein said propulsion means includes a motor having a rotatable output shaft.

4. A fishing lure as set forth in claim 3 wherein said propulsion means further includes an impeller mounted to said output shaft and encased within said body member, said impeller drawing water in through and expelling water out of said first passageway during rotation thereof by said output shaft.

5. A fishing lure as set forth in claim 1 wherein said propulsion means is wholly encased within said body member.

6. A fishing lure as set forth in claim 5 wherein said propulsion means includes an impeller located in said first passageway.

7. A fishing lure as set forth in claim 1 wherein said controller includes a printed circuit board coupled to said propulsion means.

8. A fishing lure as set forth in claim 7 wherein said printed circuit board includes a timer means for periodically actuating said propulsion means.

9. A fishing lure as set forth in claim 8 wherein said timer means includes sensor means for lengthening and shortening periodic actuation of said propulsion means.

10. A fishing lure as set forth in claim 9 wherein said timer means includes a water temperature sensor and said periodic actuation of said propulsion means is lengthened upon a decrease of ambient water temperature and shortened upon an increase of ambient water temperature.

11. A fishing lure as set forth in claim 1 wherein said tail member is removably mounted over said body member.

12. A fishing lure as set forth in claim 1 further comprising a tubular liner located within said second passageway and through which water is expelled by said propulsion means.

13. A fishing lure as set forth in claim 12 wherein said tubular liner has one end secured to said body member.

14. A fishing lure as set forth in claim 1 wherein said body and tail members, when secured together, are in a shape resembling natural bait.

* * * * *